Aug. 6, 1940.　　　　　　D. LIGHTHILL　　　　　　2,210,248
DOWNSPOUT SHIELD FOR EAVES TROUGHS
Filed Oct. 23, 1939

Dean Lighthill INVENTOR.
BY
H. G. Burns ATTORNEY.

Patented Aug. 6, 1940

2,210,248

UNITED STATES PATENT OFFICE 2,210,248

DOWNSPOUT SHIELD FOR EAVES TROUGHS

Dean Lighthill, Oakwood, Ohio

Application October 23, 1939, Serial No. 300,747

5 Claims. (Cl. 108—30)

This invention relates to downspout shields for eaves troughs, and an object thereof is to provide a shield applicable to an eaves trough over its downspout connection, so formed that floating debris in the trough becomes elevated and detained in such position, thus to permit water in the trough to flow freely beneath the accumulated debris and drain through the downspout.

Another object of the invention is to so construct the shield that floating debris lodged thereon is prevented from lowering onto the bottom of the trough as the level of water in the trough recedes, thus to obviate clogging of the shield.

And a further object of the invention is to afford means whereby to cause floating debris in an eaves trough to become stranded in a location elevated from the bottom of the trough and thus prevent clogging of the trough, and facilitate drying of the debris subsequent to draining of the trough.

An illustrative embodiment of the invention is shown in the accompanying drawing, in which.

Figure 1:
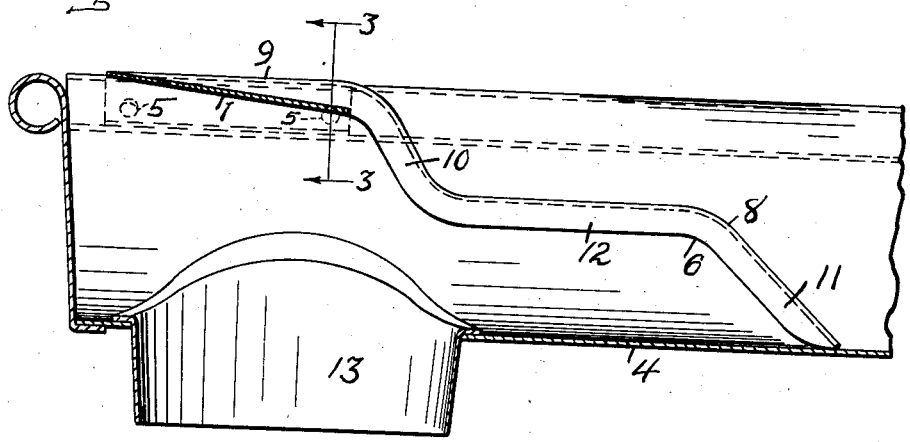
Fig. 1 is a side view of a downspout shield in a preferred form of the invention applied to an eaves trough, the view being in longitudinal section.
Figure 2:
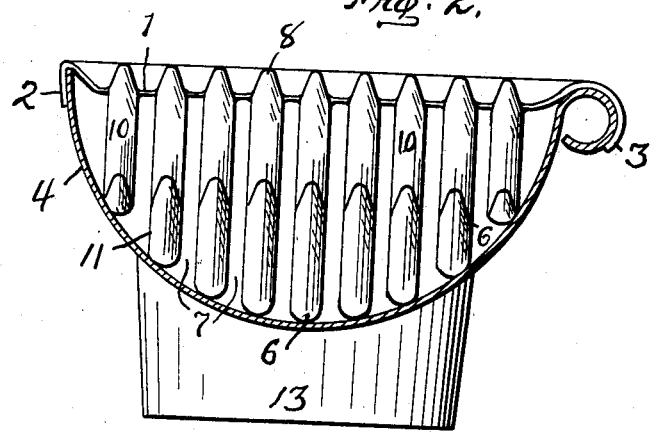
Fig. 2 is an end view projected from Fig. 1, the trough being in section.
Figure 3:
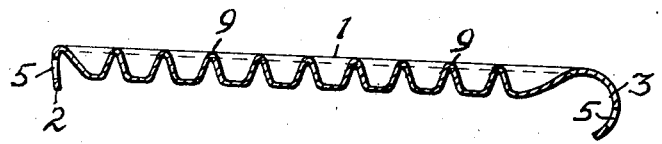
Fig. 3 is a transverse section of the shield on the line 3—3 of Fig. 1.

The illustrative embodiment of the invention is of a shield preferably formed of sheet metal and shaped to provide a bridge-plate 1 constituting the base of the guard, the sides of which have downturned portions 2 and 3 adapted to fit over the corresponding sides of an eaves trough 4. Preferably, the downturned portions have made therein openings 5 through which securing wires (not shown) may be strung and attached around the trough in any suitable manner, thus to hold the guard firmly in place on the trough.

Formed with the bridge-plate are a series of parallel fingers 6 that project from the inner end of the bridge-plate and are spaced apart to afford water passageways 7 therebetween. The fingers are laterally arched upwardly throughout their lengths so that each presents a crest 8 that extends from its extreme inner end over onto the bridge-plate as indicated by 9. Each finger is bent so that its proximal portion 10 and its distal portion 11 are inclined toward its outer end and are interposed by a medial portion 12 that is substantially horizontal and located in a plane spaced between the bottom and top of the trough.

In use, the shield is secured in operative position in the trough by springing the bent sides thereof 1 and 3 down over the corresponding rims of the trough, or, is secured by applying solder, wires, or other suitable means. When the bridge-plate is thus secured in place above the downspout 13, the inner ends of the fingers rest upon the bottom of the trough at points therein spaced backwardly from the downspout. Water entering the trough, as from the eaves of a building, flows through the passageway 7 between the fingers and drains from the trough through the downspout, and any floating debris in the trough carried by the water encounters the distal ends of the fingers or passes over onto the medial portions 12 according to the depth of water in the trough. Any banking of the water by debris accumulating against the distal ends of the fingers causes the level of the water in the trough to rise, whereupon the debris is floated up onto the medial portions 12 and thus the banked water is free to move through the passageways 7 and become discharged into the downspout. Upon recession of the level of water in the trough, the debris accumulates upon the fingers, is left suspended above the bottom of the trough and the outflow of water from the trough is left without obstruction. Continual crowding of debris onto the medial portions 12 of the fingers causes movement of the accumulation up over the proximal ends of the fingers over the bridge-plate. In this manner the trough is relieved of floating debris without the guard or trough becoming clogged with stranded debris.

Variations of the particular construction of the appliance above disclosed may readily be made by exercise of engineering skill without departure from the spirit or scope of the invention, and the following claims are intended to be inclusive of such variations.

What I claim is:

1. An eaves trough downspout shield consisting of a form shaped to provide a bridge-plate and a series of fingers extending from one end of said plate, spaced apart from each other to provide water passageways therebetween, and shaped so as to have upwardly inclined proximal and distal portions and corresponding medial substantially horizontal portions whereby to cause floating debris to become elevated onto said fingers by the rise of water in the trough and become stranded thereon in elevated position upon recession of the level of water in the trough, the sides of said bridge-plate having means for securing the shield on said trough.

2. A shield for the downspout of an eaves trough, said shield consisting of a bridge-plate the sides of which have means for securing it on said trough, and a series of fingers extending from one end of said bridge-plate and spaced apart from each other to provide water passageways therebetween, said fingers having upwardly inclined proximal and distal portions and corresponding medial substantially horizontal portions whereby to cause debris floating upon the water in said trough to pass onto said fingers and become stranded in elevated position thereon as the trough is drained.

3. A downspout shield for an eaves trough, said shield being formed of a metallic sheet shaped to provide a bridge-plate the sides of which have means to secure same on the trough, and fingers spaced apart from each other extending from one end of said bridge-plate and shaped so that the ends of said fingers rest upon the bottom of the trough when the shield is in place, said fingers being inclined upwardly toward said bridge-plate and provided with medial substantially horizontal portions upon which debris floated by water in said trough becomes stranded in elevated position upon draining of the trough.

4. A downspout shield for an eaves trough, said shield being formed of a metallic sheet shaped to provide a bridge-plate the sides of which have means to secure same on the trough, and fingers spaced apart from each other extending from one end of said bridge-plate and shaped so the ends of said fingers rest upon the bottom of the trough when the shield is in place, said fingers being inclined upwardly toward said bridge-plate and transversely arched to form corresponding longitudinal crests that extend throughout the lengths of the fingers and continue onto said bridge-plate whereby to cause debris floated by water in said trough to become stranded on said fingers in elevated position upon draining of the trough.

5. A downspout shield for an eaves trough, said shield consisting of a bridge-plate provided with means for securing it on said trough, and provided with a series of fingers spaced apart from each other to provide water passageways therebetween, said fingers being upwardly inclined toward said bridge-plate and so shaped as to permit debris floated by water in said trough to pass upwardly onto said fingers and become stranded thereon in elevated position upon draining of the trough.

DEAN LIGHTHILL.